July 24, 1956  H. L. MYRENT ET AL  2,756,026
THERMOSTATICALLY CONTROLLED TEMPERATURE REGULATING SYSTEM
Filed Feb. 11, 1953  3 Sheets-Sheet 1
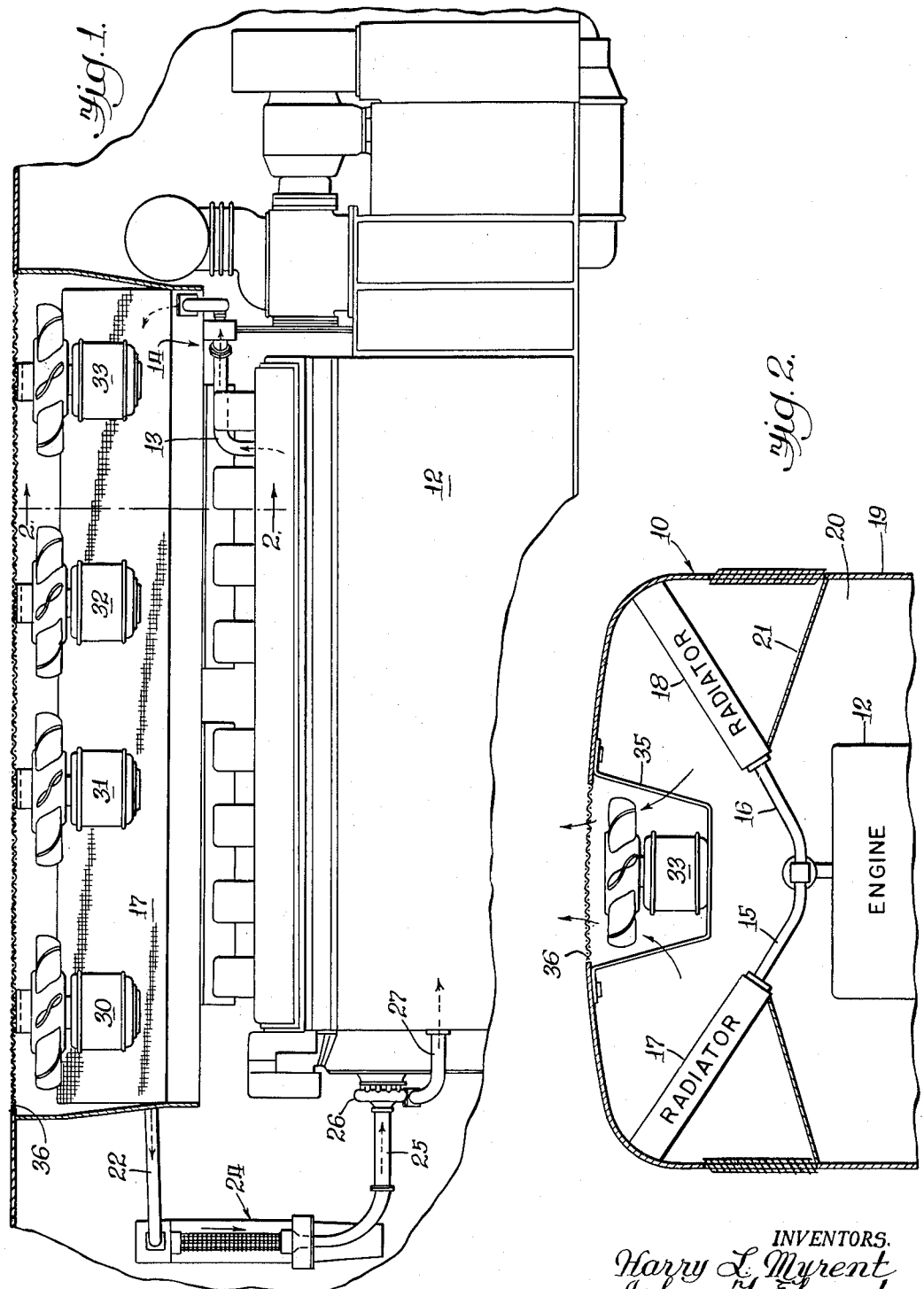
INVENTORS.
Harry L. Myrent
John T. Elwood
By Harvey M. Gillespie Atty.

July 24, 1956   H. L. MYRENT ET AL   2,756,026
THERMOSTATICALLY CONTROLLED TEMPERATURE REGULATING SYSTEM
Filed Feb. 11, 1953   3 Sheets-Sheet 2

INVENTORS.
Harry L. Myrent
John J. Elwood
By Harvey M. Gillespie Atty.

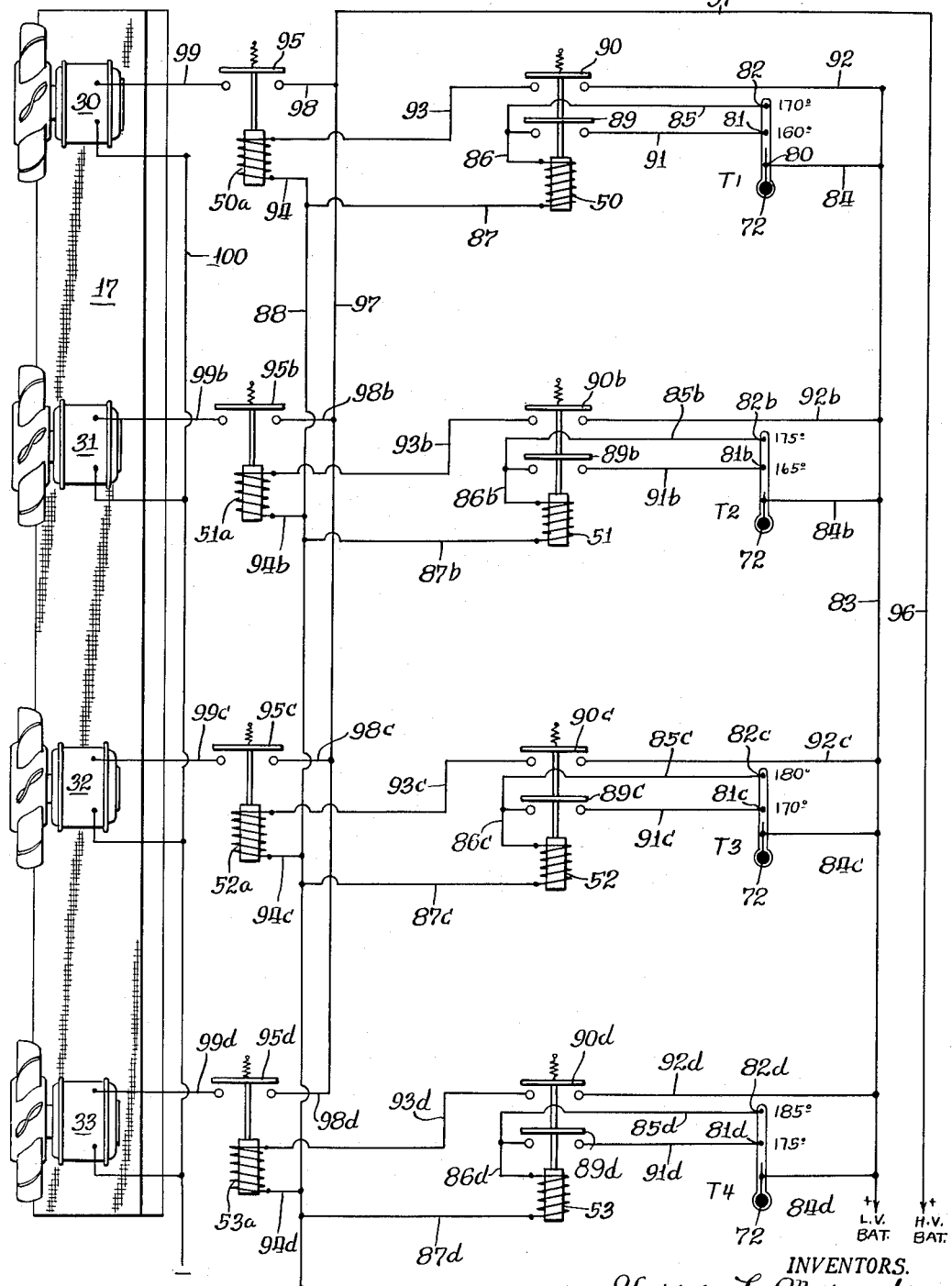

United States Patent Office 2,756,026
Patented July 24, 1956

2,756,026

THERMOSTATICALLY CONTROLLED TEMPERATURE REGULATING SYSTEM

Harry L. Myrent, Chicago, and John T. Elwood, Elmhurst, Ill., assignors to Vapor Heating Corporation, Chicago, Ill., a corporation of Delaware Application February 11, 1953, Serial No. 336,244

5 Claims. (Cl. 257—2)

The present invention relates to thermostatically controlled temperature regulating systems for varying the effectiveness of an air-cooled heat exchanger connected in a liquid circulating cooling system of an internal combustion engine. It is designed particularly to meet the requirements of the cooling system of a diesel locomotive wherein variably controlled quantities of cooling air may be passed through one or more heat exchangers or radiators for the engine cooling system under the control of the temperature attained by the coolant fluid circulated through the engine cooling system. Inasmuch as the invention is capable of being used in other situations, it will be understood that the specific temperature control system herein shown is intended merely as an illustration and not as a limitation.

In the specific application illustrated herein, the invention, briefly, contemplates the provision of a thermostat cluster consisting of a plurality of individual independently operable immersion type thermostats arranged to extend into the coolant fluid circulating through the engine block of a diesel-electro locomotive. Each thermostat is operable when a predetermined temperature of the coolant has been attained to close a contact thereof and is also operable when a predetermined higher temperature is reached to close another contact. The contacts associated with each thermostat are effective in a relay circuit to control the energization and de-energization of a respective impeller which, when energized, serves to cause a quantity of air to pass through a limited section of a heat exchange device or radiator through which the coolant fluid circulates and to thereby dissipate heat from the coolant. The various thermostats operate to close their respective contacts at different high and low settings so that each thermostat is effective through a different temperature range, the various temperature ranges progressing from a minimum low to a maximum high temperature, between which the system is effective and below which the system remains inoperative but conditioned for operation when a temperature within the specified range is attained.

The net result of such a system is that when the maximum temperature for which the lowest range thermostat is set has been attained, one of the impellers is set into operation and will remain in operation until such time as a minimum temperature for that particular thermostat is again reached. The same is true for the operation of each of the higher range thermostats, each being effective when its maximum temperature setting is reached to initiate operation of its respective impeller and being effective when the temperature has receded to below its minimum temperature setting to render its respective impeller inoperative. The temperature ranges of the various thermostats are preferably, but not necessarily staggered, which is to say that they overlap so that the minimum setting of one thermostat in the series is above the minimum setting of the next lower thermostat but below the maximum setting thereof. By such an arrangement it is possible to effect energization of the various impellers successively in the reverse order as the temperature of the coolant fluid progressively decreases, such operation of the system being accomplished without fluttering or "hunting" of the system when the temperature of the coolant fluid hovers in the vicinity of the maximum or minimum setting for any one particular thermostat.

The provision of a temperature control system of the character briefly outlined above being among the principal objects of the invention, other objects and advantages thereof, not at this time enumerated, will become more readily apparent as the nature of the invention is better understood.

A preferred embodiment of the invention is shown in the accompanying drawings.

Fig. 1 is a fragmentary side elevational view of the diesel engine portion of a diesel-electro locomotive to which the present improved temperature regulating system has been applied.

Fig. 2 is a sectional view taken substantially along the line 2—2 of Fig. 1.

Fig. 6 is a circuit diagram of the electrical instrumentalities employed in connection with the present invention.

Figure 3:
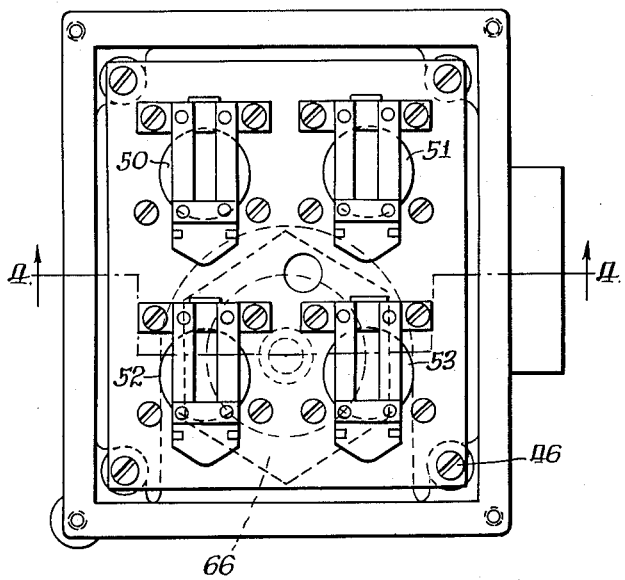
Fig. 3 is a top plan view of a thermostat cluster or assembly employed in connection with the present invention. In this view, a portion of the assembly housing has been broken away to more clearly reveal the internal mechanism thereof.

Referring now to the drawings in detail and in particular to Figs. 1 and 2, the temperature regulating system of the present invention is shown as being applied to a diesel-electro locomotive which has been fragmentarily shown at 10, the representation being somewhat schematic. The locomotive includes among other things the diesel engine proper 12 which has a circulatory cooling system utilizing water or other coolant fluid which is caused to flow in a closed circulatory path or loop extending from the rear portion of the engine through a conduit 13 leading to a thermostat control assembly 14 which constitutes a part of the present invention and the nature and function of which will be made clear presently. From the thermostat assembly 14, the coolant fluid is directed through a pair of diverging conduits 15 and 16 to the rear ends of a pair of cooling radiators 17 and 18 respectively which extend along the upper region of the engine enclosure 19 on opposite sides thereof and which are suitably supported within the engine space 20 by supporting webs or straps 21. The forward ends of the radiators 17 and 18 are connected by conduits, one of which is shown in Fig. 1 at 22 to the water side of a heat exchanger in the form of a cooler 24 for the lubricating oil of the engine and from thence the coolant fluid is returned to the engine through a conduit 25, water circulation pump 26 and conduit 27.

Situated within the enclosure 19 above the level of the radiators 17 and 18 are a plurality of impeller units 30, 31, 32 and 33 which cooperate to vary the effectiveness of the radiators 17 and 18, these impellers or fan units being suitably supported by suspension brackets 35 within the space 20 and being positioned to draw cooling air through the radiators 18 for heat exchange purposes to cool the coolant fluid within the radiators and to discharge the air through a screened opening 36 provided in the top of the enclosure. While four such impellers have been disclosed herein purely for illustrative purposes, it will be understood that a greater or lesser number may be provided while at the same time preserving the essential features of the invention.

The impellers 30 to 33 inclusive are of conventional design and each includes a rotary fan blade assembly and an electric driving motor therefor. According to the control system of the present invention, the various impellers 30 to 33 inclusive are adapted to remain normally de-energized but are caused to become successively energized in a predetermined order as the temperature of the coolant fluid passing through the thermostat assembly 14 rises progressively from a predetermined minimum temperature to a predetermined maximum temperature and when this latter temperature has been attained, all of the impellers will be in operation. Conversely, as the temperature of coolant fluid passing the thermostat assembly 14 decreases from the maximum predetermined temperature, the various impellers 30 to 33 inclusive are successively cut out of operation in the reverse order and, after the temperature has decreased to a predetermined low, slightly lower than the temperature at which the first impeller 30 became energized, all of the impellers will have been de-energized.

Figure 4:
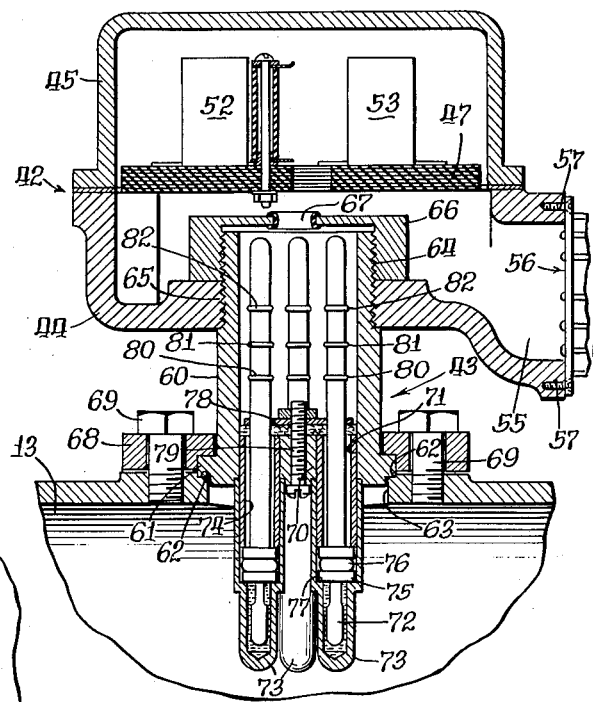
Fig. 4 is a sectional view taken substantially along the line 4—4 of Fig. 3.
Figure 5:
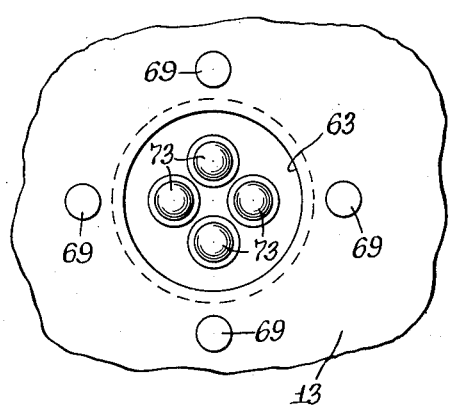
Fig. 5 is an inverted view of the thermostat cluster shown in Fig. 4.

Referring now to Figs. 3, 4 and 5 wherein the details of the thermostat assembly 14 have been shown, this assembly involves in its general organization a relay magnet housing 42 and a thermostat immersion housing 43. The relay magnet housing is comprised of two parts, namely a base member 44 and a cover member 45, the latter being held in position on the base member 44 by means of clamping screws 46. The two members 44 and 45 serve to clamp therebetween an insulating disk assembly 47 on which there is mounted certain of the various electrical elements associated with the relay mechanism of the present control system. These electrical relay elements include a series of four relay assemblies 50, 51, 52 and 53 (Figs. 3 and 6) which function to control four associated fan relays $50^a$, $51^a$, $52^a$, $53^a$ which may be arranged at any convenient location within the locomotive enclosure 10.

Referring again to Fig. 4, the base member 44 is formed with a lead-out opening 55 for the various circuit wires associated with the control system and the usual Bakelite or micarta male outlet terminal assembly 56 is shown as being applied to the outlet opening by means of attachment screws 57. The various lead-out wires however have been omitted from the disclosure of Fig. 4 since the actual circuits involved appear in Fig. 6.

The immersion thermostat housing 43 is in the form of a generally cylindrical open-ended casing 60 having a seating flange 61 adjacent one end adapted to seat on a ledge 62 surrounding the immersion opening 63 provided in the conduit section 13. The upper end of the casing 60 is threaded as at 64 and is threadedly received within the threaded bore 65 of an opening provided in the base member 44 and the casing is clamped in position on the base member 44 by means of a cap member 66 which is threadedly received on the upper open end of the casing 60. A ferrule 67 disposed within an opening provided in the cap member 66 affords a lead-out for the electrical connections extending to the various relay contacts and to the terminal assembly 56. The lower end of the casing 60 is maintained in position over the opening 63 by means of a clamping ring 68 which overlies the flange 61 and which is secured to the conduit section 13 by studs 69.

Still referring to Fig. 4, the casing 60 is formed with a web 70 extending across its lower open end and providing a series of four spaced openings 71 through each of which there extends a thermostat tube of the mercury column type, the four thermostats being designated at T1, T2, T3 and T4 (see also Fig. 6). Each thermostat has its lower end or bulb portion 72 disposed within an immersion well 73 in the form of a deep thimble-like casing the upper open end of which is brazed in position within one of the openings 71. A spacer sleeve 74 surrounds each thermostat and a pair of packing washers 75 on opposite sides of an enlargement 76 serve to retain the thermostat in its nested relation within the immersion well 73 and supported from an internal shoulder 77 formed on the well. A sealing washer assembly 78 is held in position within the casing 60 by a nut and bolt assembly 79 which passes through the web 70. If desired, the various immersion wells may be filled with a suitable liquid or semi-liquid such as silicone grease to afford good thermal conductivity.

The several thermostats T1 to T4, inclusive, are of identical construction except that they are set to function at different temperatures. Therefore, for the sake of brevity, it will be sufficient to describe thermostat T1, designate the various parts with appropriate reference numeral and designate the like electrodes and spaced contacts of the other thermostat with the same reference number with the addition of exponents $b$, $c$, and $d$, respectively. The thermostat T1 is provided with spaced apart contacts 81, 82 which define the lower and upper limits of a predetermined temperature range, for example 160° F. to 170° F. The contacts $81^b$, $82^b$ of thermostat T2 define a temperature range of 165° F. to 175° F., the contacts $81^c$, $82^c$ of thermostat T3 define a range of 170° F. to 180° F., and the contacts $81^d$, $82^d$ of thermostat T4 define a temperature range of 175° F. to 185° F. It will be observed therefore that the temperature ranges of the several thermostats overlap each other to the extent of 5° F.

Assuming now that the temperature of coolant fluid within the circulatory system of the engine is below 160° F., none of the electrical circuits of Fig. 6 will be energized and all of the fan motors 30 to 33 inclusive will remain inactive. As the temperature of the coolant fluid within the engine rises to 160° F., the mercury column of the thermostat T1 will engage the contact 81 but no circuit will be completed through this contact. As the temperature rises to 165° F. the column of the thermostat T2 will engage the contact $81^b$ but still no circuit through the system will be completed. However, when the temperature of the circulatory system attains 170° F. the mercury column will engage contact 82 of thermostat T1 and thereby establish a circuit leading from the low voltage positive line 83 through lead 84 and mercury column to contacts 81 and 82 of the thermostat T1, leads 85, 86, the winding of relay 50, and lead 87 to the low voltage negative line 88. Energization of the relay 50 closes its movable contacts 89 and 90. Closure of the contacts 89 establishes a holding circuit for holding the relay 50 energized. This holding circuit extends from the positive line 83 through lead 84 and mercury column of thermostat T1 to its contact 81, lead 91, movable contact 89 of relay 50, lead 86 and winding of relay 50 and lead 87 to the negative line 88. Closure of said contact 90 of relay 50 establishes a low voltage circuit from the positive line 83, through lead 92, energized closed contact 90 of the relay 50, lead 93 through winding of relay $50^a$ and thence through lead 94 to the low voltage negative line 88. Energization of the magnet $50^a$ through the circuit just described closes its movable contact 95 whereupon a circuit is established through the fan motor 30. This circuit extends from a high voltage positive line 96, through leads 97, 98, closed contact 95 of the relay $50^a$, lead 99 and fan motor 30 to the high voltage negative line 100.

Energization of the fan 30 by the closing of the upper contact 82 of thermostat T1 and the consequent energization of relays 50—$50^a$ sets the fan of motor 30 into operation as the sole circulating medium for air drawn through the radiators 17 and 18 of Fig. 1. The fan of motor 30 will continue to operate as long as the ambient temperature of the thermostat T1 remains above 160° F. If the temperature drops below 170° F. so as to cause the mercury column to disengage the contact 82 of the thermostat T1, the previously described holding circuit through the contact 81 and the contact 89 of the relay 50 will remain effective to maintain the relay $50^a$ energized and consequently to maintain the motor circuit through the fan motor 30 closed.

If the temperature of the circulatory cooling system of the engine rises to 175° F. so that the ambient temperature of the thermostat T2 causes the mercury column to engage the contact 82$^b$ thereof, a circuit is established from the low voltage positive line 83 to energize the relay 51 and thereby bring about the energizaion of relay 51$^a$ to close a circuit through fan motor 31. The relay and fan motor circuits for energizing the fan motor 31 are similar to the circuits hereinabove described for bringing about the energization of relays 50, 50$^a$ and fan motor 30 and are connected in parallel relation thereto. Therefore, in order to avoid duplication of description, the several circuits and the movable contacts of relays 51, 51$^a$ are identified by the same reference numeral with the addition of the letter "b." The thermostat T2, for controlling the relay 51, 51$^a$, it will be recalled has a temperature range of 165° F. to 175° F. for its contacts 81$^b$, 82$^b$ and that it functions at a temperature of 175° F. to close its upper contact 82$^b$; the circuits for the relays 51, 51$^a$ and fan motor 31 are established as previously described in connection with the energization of fan motor 30. Therefore, the fan motor 31 will remain energized as long as the ambient temperature of the coolant fluid within the engine jacket remains above the lower limit (165° F.) of the temperature setting of the thermostat T2.

The relay mechanism and circuit arrangement associated with the thermostat T3 and fan motor 32, as well as that associated with the thermostat T4 and fan motor 33, is also similar to that described previously and only the setting of the thermostat contacts is different as previously stated. Therefore, he said circuits and relay contacts are identified by the same reference numerals with the addition of letters $c$ and $d$, respectively. It will be apparent that when the ambient temperature of the thermostat T3 reaches 180° F., the motor circuit for the fan motor 32 will become energized to actuate the fan and if the ambient temperature of the thermostat T4 rises to 185° F., the fan motor 33 will be set into operation so that at this point all four of the fans will be energized.

Upon a decline in the temperature of the coolant fluid within the engine circulatory system below the maximum setting of the thermostat T4, the mercury column will disengage the contact 82$^d$. However, the relay 53 will remain energized due to the existence of the holding circuit passing through the lower contact 89$^d$ thereof until the mercury column breaks contact with the lower contact 81$^d$ at the minimum temperature setting (175° F.) for the thermostat. When this condition exists, the operation of the fan motor is stopped.

When the temperature of the coolant fluid declines to 180° F., the mercury column of the thermostat T3 will separate from the contact 82$^c$ but the relay 52 will remain energized and the fan 32 will be maintained in operation until the temperature declines below the temperature setting of the lower contact 81$^c$, for example 170° F. When this condition occurs the holding circuit through the relay contact 89$^c$ is opened and the relay 52 becomes de-energized. As a consequence of the de-energization of relay 52, the relay 52$^a$ is de-energized and the operation of fan motor 32 is stopped. A decline of the temperature below 165° F. causes the column of the thermostat T2 to recede below the contact 81$^b$ to stop the fan 31. Finally at a decline below 160° F., which is the minimum thermostat setting of the entire system, the column of the thermostat T1 will recede below the contact 81 and thereby de-energize relay 50, 50$^a$ and terminate the operation of the fan 30.

From the above description it will be seen that each thermostat is possessed of a temperature range of ten degrees Fahrenheit in which range the mercury column thereof may fluctuate without terminating the operation of its respective fan. However, if the maximum temperature setting of the thermostat is attained, the fan will continue to operate until the temperature declines below the temperature value of the lower contact. Although there is a full band or temperature range, for example ten degrees between the initial starting of any one fan and the ultimate stopping thereof, there is a reduced range, for example a five degree span of temperature differential between the successive stopping of the fans when considered collectively as a group and during a decline in ambient thermostat temperature. By such an arrangement a preceding higher temperature relay is de-energized and the associated fan operation is stopped while the temperature differential beween the actual temperature and the minimum temperature of the minimum setting of the next thermostat is such that the fans remaining in operation will be able to carry the cooling load unless here is a pronounced heat-up in the coolant fluid in the coolant circulating system of the engine.

The specific structural features of the thermostat and relay combination shown in Figs. 3, 4 and 5 of the draw- are not claimed specifically herein apart from the general combination. The specific structural features of the said thermostats and relay assemblies constitue the subject matter of the applicants' co-pending application Serial No. 551,591, filed December 7, 1955.

We claim:

1. A temperature regulating system for varying the effectiveness of an air cooled heat exchanger connected in a liquid circulating cooling system of an internal combustion engine and comprising a plurality of electrically activated impellers of fixed air output for forcing air through said heat exchanger, means for activating and de-activating said impellers to vary the volume of air passed through said heat exchanger in relation to the temperature of the liquid to be cooled; the said activating and de-activating means comprising a plurality of thermostats, one for each impeller, responsive to the temperature of the liquid within said liquid circulating cooling system and set to function successively at definite temperatures, and relay means cooperatively associated with each thermostat for closing and opening and energizing circuit for the impeller associated therewith.

2. A thermostatically controlled temperature regulating system as defined in claim 1 characterized in that each relay means includes a pilot relay and that the thermostats are provided with spaced apart contacts which collectively define a series of temperature ranges the upper and lower limits of which have progressively higher temperature values for the series, separate energizing circuits for the pilot relays connected in each case through the contact which defines the upper limit of the temperature range of its associated thermostat, whereby said impellers are activated in predetermined sequence in response to the functioning of said thermostats at the upper limits of said temperature ranges.

3. A thermostatically controlled temperature regulating system as defined in claim 2 characterized by the provision of means defining holding circuits for the several pilot relays including an energized closed contact of each relay connected in circuit with the thermostat contact defining the lower limit of the temperature range of its associated thermostat, whereby said impellers are de-activated in reverse sequence by the decline of the temperature of the liquid to be cooled below the temperature value of the thermostats contacts defining the lower limits of the successive temperature ranges.

4. A thermostatically controlled temperature regulating system as defined in claim 3 characterized in that said relay means includes a second relay associated with each pilot relay, an energizing circuit for an impeller connected through an energized closed contact of the second relay, and an energizing circuit for each second relay connected through an energized closed contact of an associated pilot relay, whereby the impeller circuit remains closed during the energized period of said pilot relay.

5. A thermostatically controlled temperature regulating system as defined in claim 4 characterized in that the several thermostats are grouped together in a cluster and are all subject to the same ambient temperature.

References Cited in the file of this patent

UNITED STATES PATENTS

| | | |
|---|---|---|
| 1,295,501 | Hines | Feb. 25, 1919 |
| 1,768,941 | Sweatt | July 1, 1930 |
| 1,880,524 | Taylor | Oct. 4, 1932 |
| 2,071,178 | Roessler | Feb. 16, 1937 |
| 2,110,168 | Parks et al. | Mar. 8, 1938 |
| 2,142,593 | Woodling | Jan. 3, 1939 |
| 2,170,310 | Shivers | Aug. 22, 1939 |
| 2,325,197 | Guilder | July 27, 1943 |
| 2,336,840 | Brehob | Dec. 14, 1943 |
| 2,339,750 | Bartholy | Jan. 25, 1944 |
| 2,341,765 | Erbguth | Feb. 15, 1944 |
| 2,480,120 | Cruzan | Aug. 30, 1949 |
| 2,556,957 | Bird | June 12, 1951 |
| 2,593,038 | Lehane et al. | Apr. 15, 1952 |
| 2,697,587 | Conison | Dec. 21, 1954 |

FOREIGN PATENTS

| | | |
|---|---|---|
| 363,370 | Great Britain | Dec. 10, 1931 |